(12) United States Patent
Arellano et al.

(10) Patent No.: US 11,276,251 B2
(45) Date of Patent: Mar. 15, 2022

(54) SELECTIVE FINGERPRINT SENSOR ACTIVATION

(71) Applicant: QUALCOMM Incorporated, San Diego, CA (US)

(72) Inventors: Suzana Arellano, San Diego, CA (US); Jessica Liu Strohmann, Cupertino, CA (US); Sherman Sebastian Antao, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/909,799

(22) Filed: Jun. 23, 2020

(65) Prior Publication Data

US 2021/0397802 A1    Dec. 23, 2021

(51) Int. Cl.
| | |
|---|---|
| *G06V 40/13* | (2022.01) |
| *G06F 3/16* | (2006.01) |
| *G06F 3/01* | (2006.01) |
| *G06V 40/12* | (2022.01) |

(52) U.S. Cl.
CPC .......... *G06V 40/1306* (2022.01); *G06F 3/016* (2013.01); *G06F 3/16* (2013.01); *G06V 40/1376* (2022.01)

(58) Field of Classification Search
CPC ...... G06K 9/0002; G06K 9/001; G06F 3/016; G06F 3/16; G01S 7/521; A61B 5/117; G06V 40/1306; G06V 40/1376
See application file for complete search history.

(56) References Cited

U.S. PATENT DOCUMENTS

| | | | |
|---|---|---|---|
| 2017/0090028 A1* | 3/2017 | Djordjev | G01S 7/521 |
| 2018/0035923 A1* | 2/2018 | Kang | A61B 5/117 |
| 2018/0218195 A1* | 8/2018 | Sheik-Nainar | G06K 9/001 |
| 2019/0294845 A1* | 9/2019 | De Foras | G06K 9/0002 |

* cited by examiner

*Primary Examiner* — Abdul-Samad A Adediran
(74) *Attorney, Agent, or Firm* — Qualcomm Incorporated

(57) ABSTRACT

Certain aspects of the present disclosure provide techniques for selectively activating a fingerprint sensor in an electronic device. A method that may be performed by the electronic device includes detecting a finger hover above the display module, activating the fingerprint sensor based, at least in part, on the detected finger hover, and providing, in response to detecting the finger hover, feedback information to assist in scanning the finger using the fingerprint sensor.

30 Claims, 9 Drawing Sheets

SELECTIVE FINGERPRINT SENSOR ACTIVATION

BACKGROUND

Field of the Disclosure

Aspects of the present disclosure relate to wireless communications, and more particularly, to techniques for selectively activating a fingerprint sensor in an electronic device.

Description of Related Art

Electronic devices utilizing a touchscreen are prevalent in today's technology and may include devices such as a smartphone, a smartwatch, or a tablet computer. A touchscreen can include an electronic visual display that a user can control through simple or multi-touch gestures by touching the screen, for example with a finger. The user can use the touchscreen to react to what is displayed and to control how it is displayed (for example, by zooming the text size). The touchscreen enables the user to interact directly with what is displayed, rather than using a mouse, touchpad, or any other intermediate device (other than a stylus, which is optional for most modern touchscreens).

Such electronic devices may also include one or more sensors or feedback devices, configured to aid the user's experience and provide security for the electronic device. However, such sensor require power to operate. Accordingly, if these sensors are always powered on, these sensor will reduce battery life of the electronic device and waste other resources. Thus, there is a need to improve control of such sensors such that they are able to function according to their purpose without wasting power.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved power usage of electronic devices that include fingerprint sensors.

Certain aspects of the subject matter described in this disclosure can be implemented in a method for activating a fingerprint sensor in a device comprising a display module. The method generally includes detecting a finger hover above the display module, activating the fingerprint sensor based, at least in part, on the detected finger hover, and providing, in response to detecting the finger hover, feedback information to assist in scanning the finger using the fingerprint sensor.

Certain aspects of the subject matter described in this disclosure can be implemented in an apparatus for activating a fingerprint sensor in a device comprising a display module. The apparatus generally includes at least one processor configured to detect a finger hover above the display module, activate the fingerprint sensor based, at least in part, on the detected finger hover, and provide, in response to detecting the finger hover, feedback information to assist in scanning the finger using the fingerprint sensor. The apparatus also includes a memory coupled with the at least one processor.

Certain aspects of the subject matter described in this disclosure can be implemented in an apparatus for activating a fingerprint sensor in a device comprising a display module. The apparatus generally includes means for detecting a finger hover above the display module, means for activating the fingerprint sensor based, at least in part, on the detected finger hover, and means for providing, in response to detecting the finger hover, feedback information to assist in scanning the finger using the fingerprint sensor.

Certain aspects of the subject matter described in this disclosure can be implemented in a non-transitory computer-readable medium for activating a fingerprint sensor in a device comprising a display module. The non-transitory computer-readable medium generally includes instructions that, when executed by at least one processor, cause the at least one processor to detect a finger hover above the display module, activate the fingerprint sensor based, at least in part, on the detected finger hover, and provide, in response to detecting the finger hover, feedback information to assist in scanning the finger using the fingerprint sensor.

Certain aspects of the subject matter described in this disclosure can be implemented in an apparatus configured to beamform ultrasonic pressure waves. The apparatus generally includes a display module comprising a first plurality of layers and a pressure wave module configured for beamforming ultrasonic pressure waves through the display module. In some cases, the pressure wave module comprises a second plurality of layers, which may comprise at least a copolymer layer, a conductive layer, a die attached film (DAF) layer, and a thin film transistor (TFT) glass layer. Additionally, in some cases, an order of the second plurality of layers in the pressure wave module depends on an acoustic resonance value associated with the display module.

Certain aspects of the subject matter described in this disclosure can be implemented in a method for operating an apparatus configured to beamform ultrasonic pressure waves. The method generally includes emitting, via a pressure wave module of the apparatus, beamformed ultrasonic pressure waves through a display module of the apparatus. In some cases, the display module comprises a first plurality of layers and the pressure wave module comprises a second plurality of layers. Additionally, in some cases, the second plurality of layers comprises at least a copolymer layer, a conductive layer, a die attached film (DAF) layer, and a thin film transistor (TFT) glass layer. Additionally, in some cases, an order of the second plurality of layers in the pressure wave module depends on an acoustic resonance value associated with the display module. In some cases, the method may also include receiving, via the pressure wave module, at least one response pressure wave in response to the beamformed ultrasonic pressure waves and detecting a finger hover above the display module based on the at least one response pressure wave.

Certain aspects of the subject matter described in this disclosure can be implemented in an apparatus for beamforming ultrasonic pressure waves. The apparatus generally includes at least one processor configured to control a pressure wave module of the apparatus to emit beamformed ultrasonic pressure waves through a display module of the apparatus. In some cases, the display module comprises a first plurality of layers and the pressure wave module comprises a second plurality of layers. Additionally, in some cases, the second plurality of layers comprises at least a copolymer layer, a conductive layer, a die attached film (DAF) layer, and a thin film transistor (TFT) glass layer. Additionally, in some cases, an order of the second plurality of layers in the pressure wave module depends on an acoustic resonance value associated with the display module. In some cases, the at least one processor may further be configured to receive at least one response pressure wave in response to the beamformed ultrasonic pressure waves and detect a finger hover above the display module based on the at least one response pressure wave. Additionally, the apparatus may also include a memory coupled with the at least one processor.

Certain aspects of the subject matter described in this disclosure can be implemented in an apparatus for beamforming ultrasonic pressure waves. The apparatus generally includes a display module comprising a first plurality of layers and a pressure wave module configured for beamforming ultrasonic pressure waves through the display module. The pressure wave module may be configured to generate ultrasonic pressure waves at a frequency. The apparatus may also include an adhesive layer coupling the pressure wave module with the display module. In some cases, a thickness of the adhesive layer is configured to be one of a half-wavelength of the frequency or a quarter-wavelength of the frequency. The apparatus may also include a spacer layer disposed between the display module and the pressure wave module. The spacer layer may affect a spatial resolution associated with a response signal received by the pressure wave module and may be disposed between the adhesive layer and pressure wave module. In some cases, the pressure wave module comprises a second plurality of layers, which may comprise at least a copolymer layer, a conductive layer, a die attached film (DAF) layer, and a thin film transistor (TFT) glass layer. Additionally, in some cases, an order of the second plurality of layers in the pressure wave module depends on an acoustic resonance value associated with the display module. Further, in some cases, the order comprises the TFT glass layer being disposed below a bottom layer of the first plurality of layers of the display module, the copolymer layer being disposed below the TFT glass layer, the conductive layer being disposed below the copolymer layer, and the DAF layer being disposed below the conductive layer.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Certain aspects of the present disclosure provide methods and apparatus for activating a fingerprint sensor in a device comprising a display module. For example, in some cases, a finger hover may be detected above the display module. In response, at least a portion of the fingerprint sensor may be activated based on the detected finger hover. Additionally, in some cases, feedback may be provided to assist in scanning the finger using the fingerprint sensor. In some cases, the finger hover may be detected by beamforming ultrasonic pressure waves through the display module. Accordingly, aspects of the present disclosure also provide methods and apparatus for beamforming ultrasonic pressure waves.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

As noted above, electronic devices utilizing a touchscreen are prevalent in today's technology. Such electronic devices may include one or more components for displaying information, providing feedback, and providing security for the electronic device. One such component may include, for example, a fingerprint sensor, which may comprise one or more components configured to capture an image of a fingerprint pattern. The fingerprint pattern may be used identify the user and provide access to the electronic device.

In recent years, various electronic fingerprint scanning systems have been developed utilizing optical, capacitance, direct pressure, thermal and ultrasonic methods. Techniques based on ultrasound have proven to be highly accurate, being insulated from the effects of grease, dirt, paint, ink and other image contaminants. In an ultrasonic system, as explained below, a piezoelectric transducer may be used to send an ultrasonic wave through an ultrasound transmitting media, which may be used to capture an image of the fingerprint pattern, as explained below.

Figure 1:
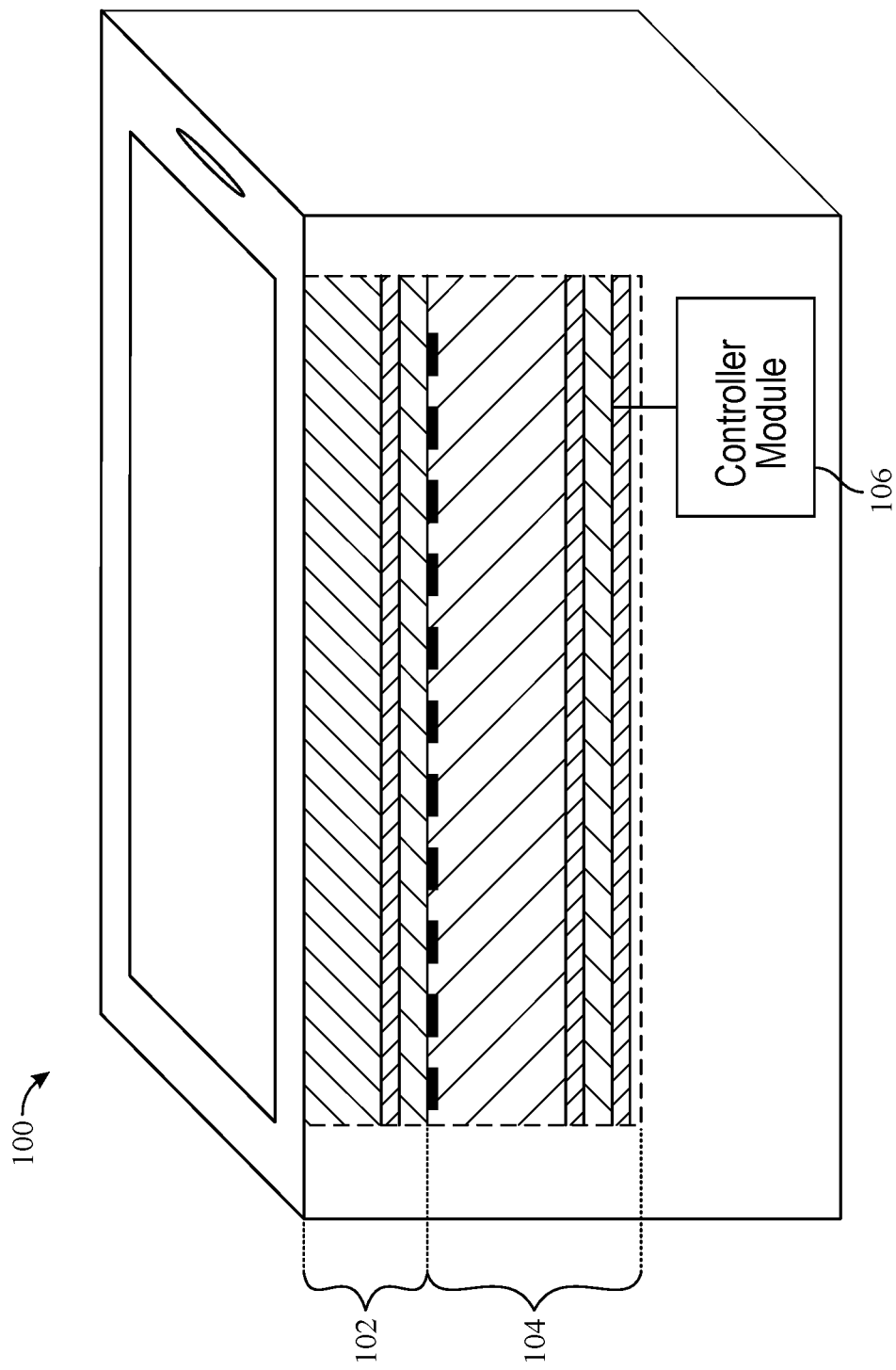
FIG. 1 is a perspective view of an electronic device including a fingerprint sensor, in accordance with certain aspects of the present disclosure.

FIG. 1 is a perspective view of one such electronic device 100. As illustrated, the electronic device 100 may include a display module 102, a fingerprint sensor 104, a controller module 106.

The display module 102 may generally include a first plurality of layers and may be used to display information and receive input from a user. The first plurality of layers may comprise one or more of a cover glass layer, a first optical clear adhesive (OCA) layer, a polarizer layer, a back plate pressure-sensitive-adhesive layer (BPSA), a touch sensor layer, a second OCA layer, and a display panel.

Figure 4:
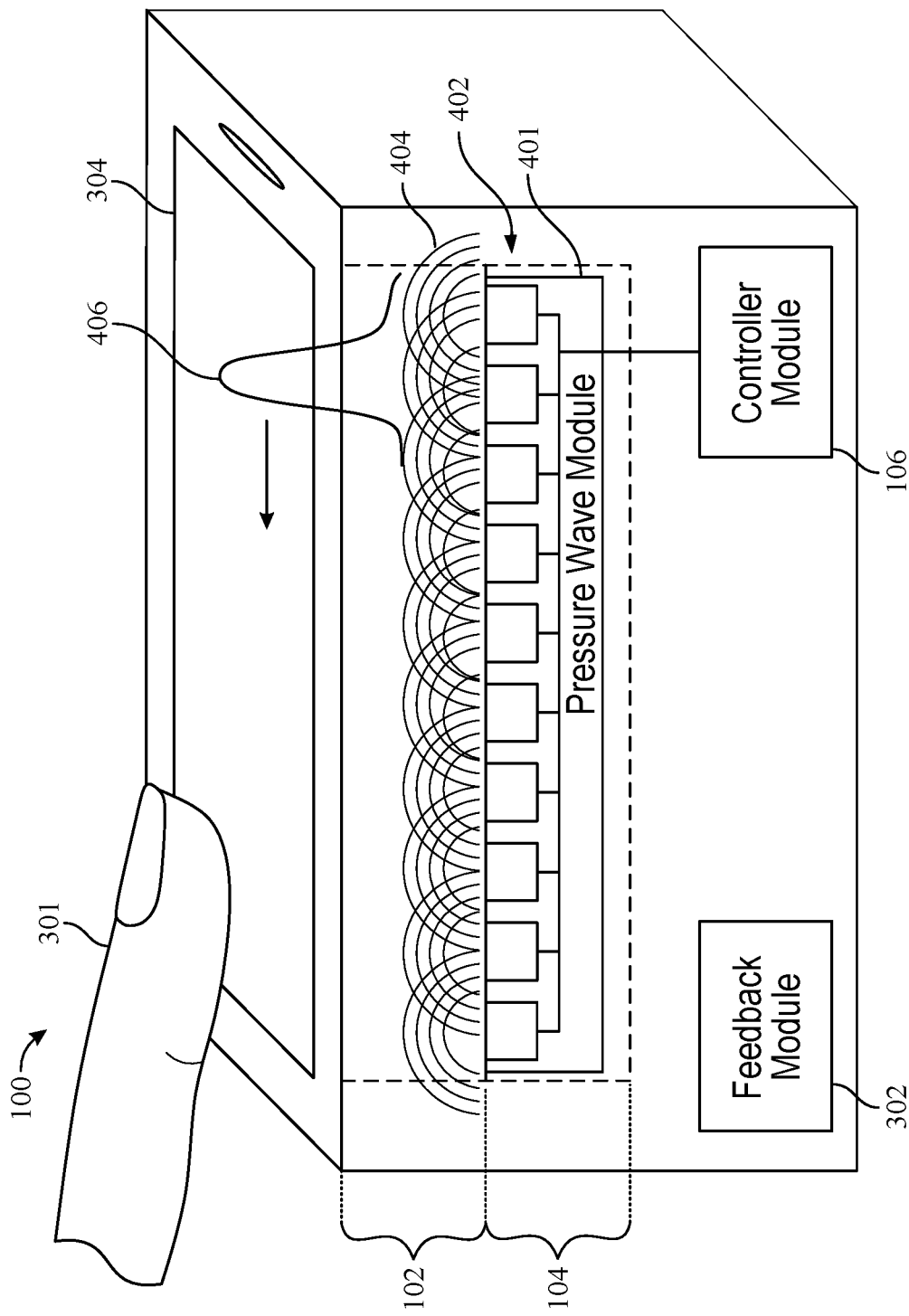
FIG. 4 illustrates detecting the finger hover based on a planar pressure wave, in accordance with certain aspects of the present disclosure.

The fingerprint sensor 104 may be disposed below the display module 102 and may include a plurality of transducer devices (e.g., as shown in FIG. 4) configured to emit pressure waves (e.g., sound waves) to scan a fingerprint of a user and provide access to the electronic device 100, as explained below. In some cases, the fingerprint sensor 104 may include a pressure wave module (e.g., pressure wave module 401, illustrated in FIG. 4) that includes a second plurality of layers, such as a copolymer layer, a conductive layer (e.g., silver (Ag) ink), a dielectric protection layer (e.g., a die attached film (DAF) layer), and a thin film transistor (TFT) glass layer.

In pressure-wave-based fingerprint scanners, a controller module 106 may control the plurality of transducer devices to emit pressure wave pulses. At each material interface encountered by the pulse, a portion of the pulse may be reflected. For example, an interface between a surface of a screen and skin or the interface between air and skin may each reflect a portion of the pulse. The fraction of ultrasound reflected is a function of differences in impedance between the two materials comprising the interface. The fraction of ultrasound reflected can be calculated by the equation, $R=((Z1-Z2)/(Z1+Z2))^2$, where R is the fraction of sound reflected, $Z_1$ is the acoustic impedance of a first material and $Z_2$ is the acoustic impedance of a second material. Acoustic impedance is a measure of a material's resistance to the propagation of sound. Acoustic impedance, Z, may be defined as $Z=r \cdot c$, where r is the density of the material, and c is the longitudinal propagation velocity of ultrasound in the material. The larger the change in acoustic impedance, the larger the fraction reflected.

The reflected wave pulses may be detected by a detector in the fingerprint sensor 104. The elapsed time during which the pulse traveled from the ultrasound pulse emitter to the interface (e.g., the skin of a user) and back may be determined. The elapsed time may be used to determine the distances traveled by the pulse and its reflected wave pulses. By knowing the distance traveled, the position and features of an interface may be determined. For example, by emitting a plurality of wave pulses and receiving their corresponding reflections, minute features of an object, such as fingerprints of a finger, may be determined.

Current fingerprint sensors in electronic devices, such as mobile devices, are very small in size and require precise finger placement on the sensor to successfully match a fingerprint and unlock the device. One way to address this issue is to use a larger fingerprint sensor scan area. However, larger sensors generally use more power, and power consumption is a key design constraint in mobile devices.

Accordingly, aspects of the present disclosure provide techniques for alleviating such power consumption concerns. For example, aspects of the present disclosure provide techniques for selectively activating the fingerprint sensor in response to detecting a finger hover above the display module of the electronic device. Accordingly, the fingerprint sensor may primarily remain in a low power mode until a finger hover above the display module of the electronic device is detected, saving power. In some cases, the finger hover may be detected using a planar pressure wave. In other cases, the finger hover may be detected using beamformed pressure waves. Due to acoustic interference concerns, aspects of the present disclosure also provide techniques for improving beamforming of pressure waves to detect the finger hover, as explained below.

Figure 2:
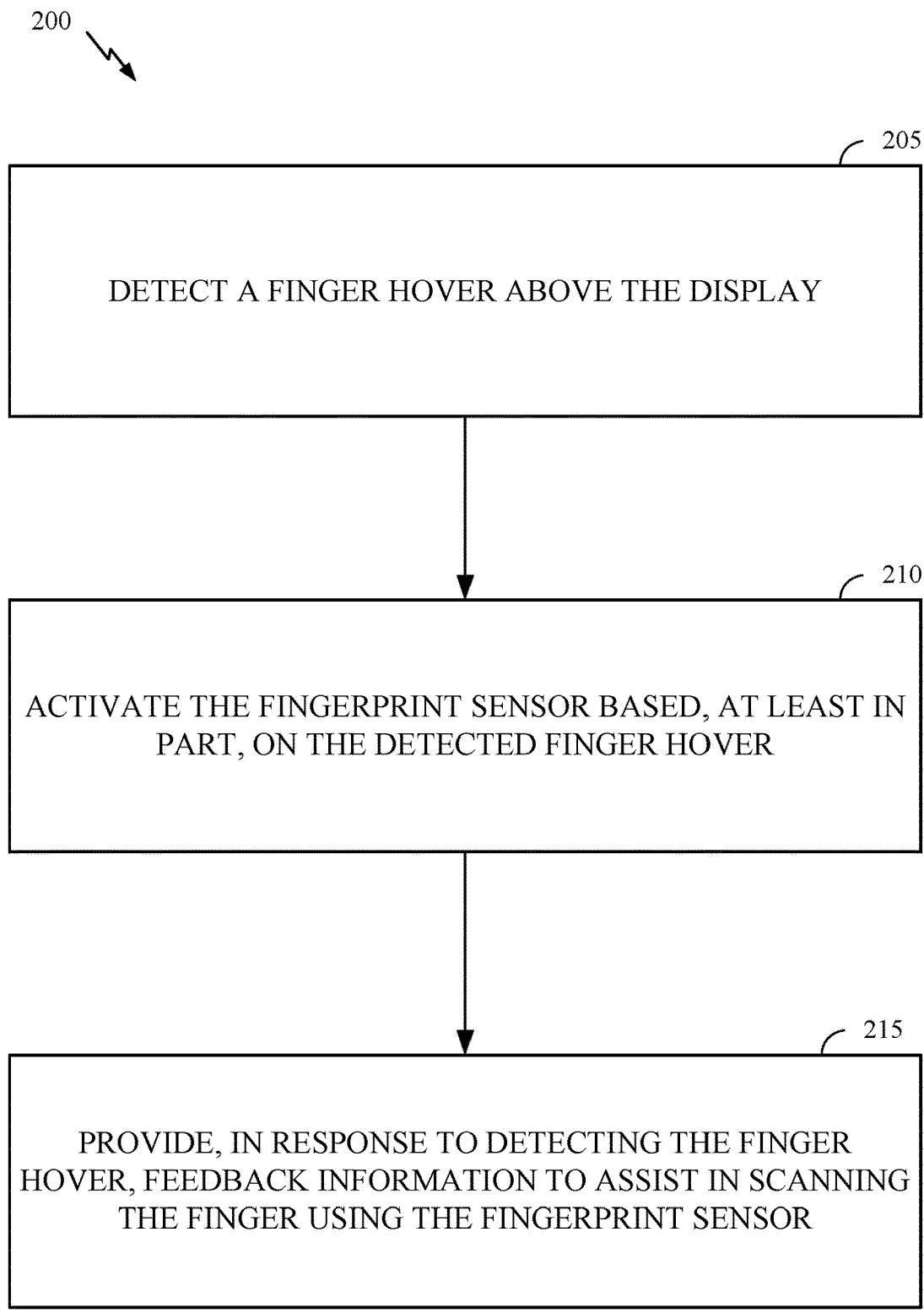
FIG. 2 is a flow diagram illustrating example operations for activating the fingerprint sensor of the electronic device, in accordance with certain aspects of the present disclosure.

FIG. 2 is a flow diagram illustrating example operations 200 for activating a fingerprint sensor in a device comprising a display module, in accordance with certain aspects presented herein. According to aspects, operations 200 may be performed, for example, by one or more processors, such as the controller module 106 and/or processor 904.

Operations 200 begin at block 205 with detecting a finger hover of a user of the device above the display module.

At block 210, the one or more processors activate the fingerprint sensor based, at least in part, on the detected finger hover.

In some cases, activating the fingerprint sensor may mean activating a more-advanced processing capability associated with the fingerprint sensor. For example, in some cases, as explained below, the finger print sensor may itself be used to detect the finger hover. In such cases, the fingerprint sensor may be operating in a power saving mode, expending just enough power to emit pressure waves and detect a reflection of a finger hovering above the display module, for example, as opposed to operating in a more-advanced processing mode in which the fingerprint sensor is capable of scanning the actual fingerprints on the finger (which may consume a significant amount of power).

In other cases, a different means may be used to detect the finger hover, allowing the fingerprint sensor to remain in an off state until the finger hover is detected.

At block 215, the one or more processors provide, in response to detecting the finger hover, feedback information to assist in scanning the finger using the fingerprint sensor. In some cases, the feedback may also be provided in response to activating the fingerprint sensor. According to aspects, the feedback may be any type of feedback that assists the user in scanning the finger, such as visual, audio, haptic, and the like.

Figure 3:
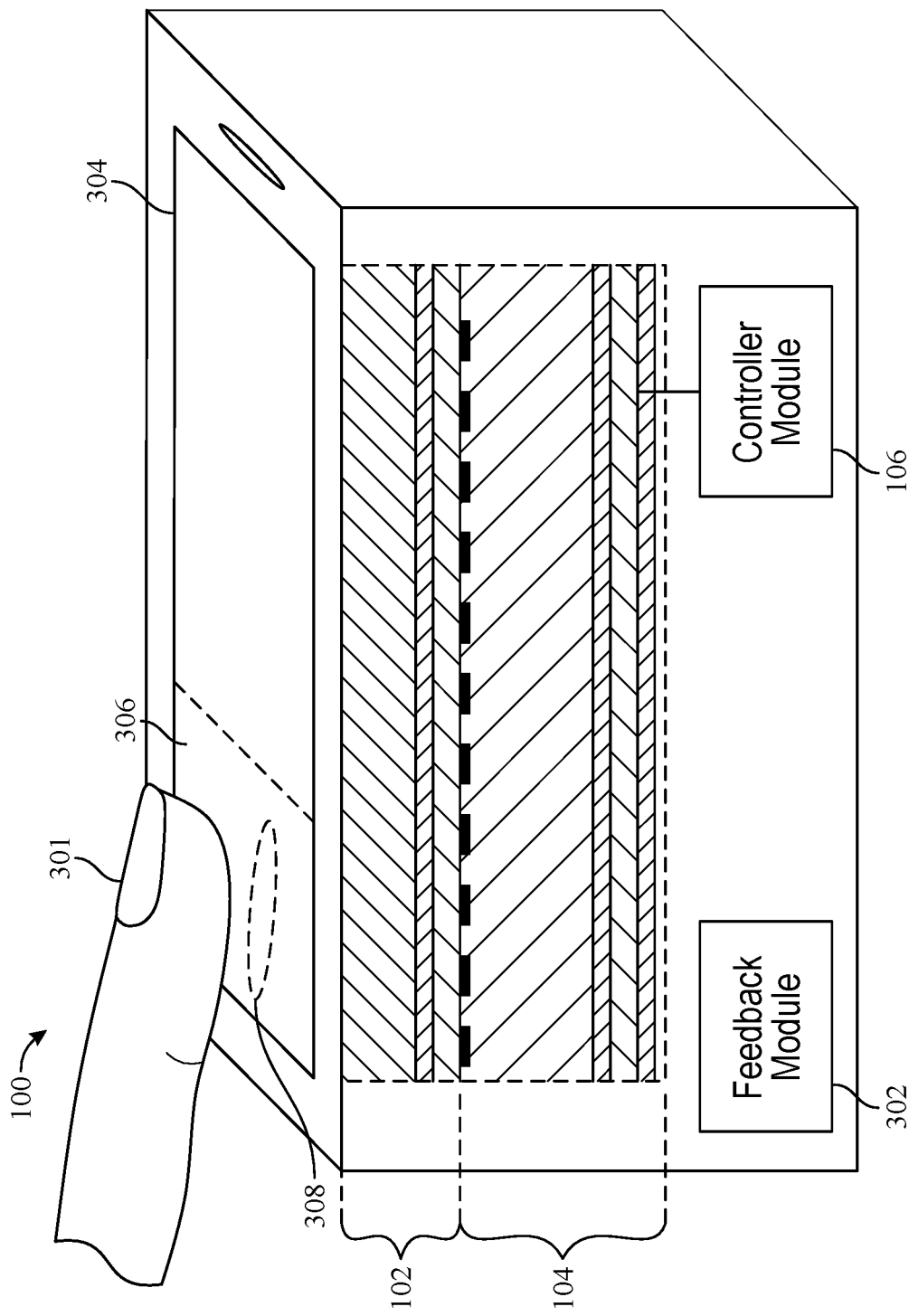
FIG. 3 illustrates activating the fingerprint sensor based on a detected finger hover, in accordance with certain aspects of the present disclosure.

FIG. 3 provides an illustration of the techniques for detecting a finger hover and selectively activating a fingerprint sensor of an electronic device 100, in accordance with certain aspects presented herein.

For example, as illustrated, at some point in time, a user of the electronic device 100 may position a finger over (e.g., hovering over and not touching) the display module 102, which may be detected by the electronic device 100. In some cases, the electronic device 100 may detect the finger hover based on at least one of an inductance-based sensor, a capacitance-based sensor, an optical-based sensor, or an sound-based sensor (e.g., the fingerprint sensor 104).

In response to detecting the finger hover, the fingerprint sensor 104 in the electronic device 100 may be activated.

As noted above, the fingerprint sensor 104 an ultrasonic fingerprint sensor configured for sensing fingerprints based on pressure waves (e.g., ultrasonic pressure waves). In other words, the fingerprint sensor 104 may remain in a power-saving mode, reducing the power consumed by the fingerprint sensor 104, until a finger hover is detected.

Further, in response to detecting the finger hover, a feedback module 302 in the electronic device 100 may generate and provide feedback information to assist in scanning the finger using the fingerprint sensor 104. The feedback may be any type of feedback that assists in scanning the finger, such as visual feedback displayed on a screen 304 of the display module 102, haptic feedback, auditory feedback, and the like.

For example, in some cases, the feedback module 302 may generate and display visual feedback, instructing a user where to scan the finger on the screen 304. In other words, in response to the detected finger hover, the display module 102 may be activated and feedback displayed on the screen 304 of the display module 102. In some cases, haptic feedback (e.g., vibration) may be provided throughout the electronic device. In other cases, the haptic feedback may be localized in an area of the electronic device 100 underneath the finger hover 301. Additionally, in some cases, haptic feedback may be provided by a force sensor or a tactile sensor.

In some cases, another way to reduce power consumed by the fingerprint sensor 104 may be to activate only a portion of a larger area of the fingerprint sensor 104.

In some cases, the portion of the larger area may comprise a fixed portion. For example, in some cases, only a fixed portion of the fingerprint sensor 104 underneath the portion 306 of the screen 304 may be activated, leaving a remaining portion of the fingerprint sensor inactivated and saving power. As shown, the fixed portion may correspond to a bottom portion of the fingerprint sensor 104. According to aspects, the feedback information provided by the feedback module 302 may inform the user of the electronic device 100 to scan the finger on the portion 306 of the screen 304.

In some cases, the portion of the larger area of the fingerprint sensor 104 may be a variable portion. For example, in some cases, the variable portion may correspond to an area of the fingerprint sensor underneath the finger hover, such as the variable portion 308. For example, in some cases, when the finger hover 301 is detected, a general position associated with the finger hover 301 may also be determined. Accordingly, the variable portion 308 may correspond to the determined position of the finger hover 301.

In other cases, the electronic device 100 may determine the variable portion 308 based on at least one of a pattern of usage of the device by the user and a finger touch area range associated with the finger. For example, in some cases, the electronic device 100 may collect statistics regarding where a user of the electronic device 100 most often touches the screen 304. Accordingly, the variable portion 308 may then be set to the area of the screen 304 that the user most often touches. According to aspects, the feedback information provided by the feedback module 302 may inform the user of the electronic device 100 to scan the finger on the variable portion 308 of the screen 304 that the user most often touches. In some cases, if the user tries to scan the finer in an incorrect area, the feedback module 302 may provide additional feedback to the user to help correct the improper scan, such as directing the user to scan the finger in the variable portion 308.

Additionally, as noted, in some cases, the electronic device 100 may take into account a finger touch area range associated with the finger. For example, in some cases, the electronic device may be able to deduce a type of the finger (e.g., thumb, index, etc.) and use this information to appropriately set the variable portion 308. Further, in some cases, the variable portion 308 may be adjustable based on a size of the finger. For example, in some cases, the variable portion 308 corresponding to a thumb may be larger than the variable portion 308 corresponding to an index finger.

Further, in addition to depending on the finger hover 301, the variable portion 308 may, in some cases, also be based on an area in which the finger touches the screen 304. For example, in some cases, the variable portion 308 may be set to a first location of the screen 304. Upon detecting the finger touching the screen 304, the electronic device 100 may determine how much of the finger is inside the first location of the variable portion 308 and how much of the finger is outside the first location of the variable portion 308. Based on these determinations, the electronic device 100 may deduce a second location of the screen 304 for the variable portion 308 such that the finger touch is located fully within the second location of the screen 304 for the variable portion 308.

According to aspects, in response to detecting the finger hover 301 only the variable portion 308 of the fingerprint sensor 104 may be activated or transitioned from a power saving mode into a different mode. By only activating the variable portion 308 of the fingerprint sensor 104, power consumption by the fingerprint sensor 104 may be reduced as compared to activating the fingerprint sensor 104 as a whole. Further, according to aspects, regardless of the position of the variable portion 308, the feedback information provided by the feedback module 302 may inform the user of the electronic device 100 to scan the finger on a portion of the screen 304 corresponding to the variable portion 308.

As noted above, in some cases, the finger hover 301 may be detected using the fingerprint sensor 104. More specifically, for example, in some cases, detecting the finger hover comprises emitting pressure waves from the fingerprint sensor 104 (e.g., via a pressure wave module 401 illustrated in FIG. 4) through different portions of the display module 102 and detecting the finger hover above at least one portion of the different portions of the display module 102, as described above.

It should be understood that, while aspects of the present disclosure describe techniques for selectively activating a fingerprint sensor based on a detected finger over, these techniques may apply equally to other types of detected bodily hovers. For example, in some cases, the techniques presented herein for detecting the finger hover and activating the fingerprint sensor based on the finger hove may apply equally to a detected hand hovering above or waved across (e.g., either close-fisted or open-fisted) the display module, as well as other appendages, such as arms, feet, etc.

In some cases, detecting the finger hover may be based on a planar pressure wave emitted by the fingerprint sensor 104 via a pressure wave module. For example, the pressure waves may be emitted in a kilohertz range and may be emitted such that at least one planar wave emitted through the different portions of the display module 102 of the electronic device 100. For example, as illustrated in FIG. 4, a pressure wave module 401 in the fingerprint sensor 104 may include a plurality of transducers 402 configured to emit pressure waves 404. According to aspects, the controller module 106 may be configured to control different sets of transducers of the plurality of transducers 402 to selectively emit the pressure waves 404, generating a planar pressure wave 406. The planar pressure wave 406 may then be directed across the screen 304 by selectively controlling the different sets of transducers.

According to aspects, once the planar pressure wave 406 is directed into an area beneath the finger hover 301, a plurality of pressure waves may be reflected by the finger and received by the pressure wave module 401, allowing the fingerprint sensor 104 to detect the finger hover 301. For example, in some cases, detecting the finger may be based on a certain receive signal strength of pressure waves reflected from the finger. For example, in some cases, the pressure wave module 401 may receive a plurality of response pressure waves in response to the planar pressure wave 406. According to aspects, if the plurality of response pressure waves received by the pressure wave module 401 have a signal strength above a certain threshold, the fingerprint sensor 104 may detect the finger hover 301.

In some cases, such techniques of using a planar pressure wave 406 to detect the finger hover 301 may be better suited when used with pressure waves at certain frequencies, such as pressure waves emitted in the kilohertz range, due to the way in which certain pressure waves propagate through air. For example, pressure waves in the kilohertz range may be better at propagating through the air, allowing for the finger hover 301 to be detected at a greater distance (e.g., several millimeters) above the display module 102 as opposed to pressure waves in, for example, a megahertz range (e.g., ultrasound). For example, pressure waves in the megahertz range may quickly attenuate at an interface between the screen 304 and air surrounding the electronic device 100, preventing the finger hover 301 from being detected more than a few micrometers above the display module 102.

However, a problem that may be experienced by using pressure waves in the kilohertz range is that such pressure waves can be heard whereas ultrasonic pressure waves are generally inaudible to humans. Being able to hear the pressure waves while trying to scan a fingerprint may be irritating to some users. Therefore, techniques presented herein provide techniques to improving the use of ultrasonic pressure wave (e.g., which are generally inaudible to most users) such that a finger hover may be detected at greater distances above the display module 102. Such techniques may involve beamforming ultrasonic pressure wave through different portions of the display module 102, providing for a better received signal strength associated with pressure waves reflected off of a hovering finger and allowing the finger to be detected at greater distances above the display module 102. Aspects of the present disclosure also provide techniques for improving beamforming, which take into account different design considerations associated with the fingerprint sensor 104 and display module 102.

Techniques for Beamforming Pressure Waves

Figure 5:
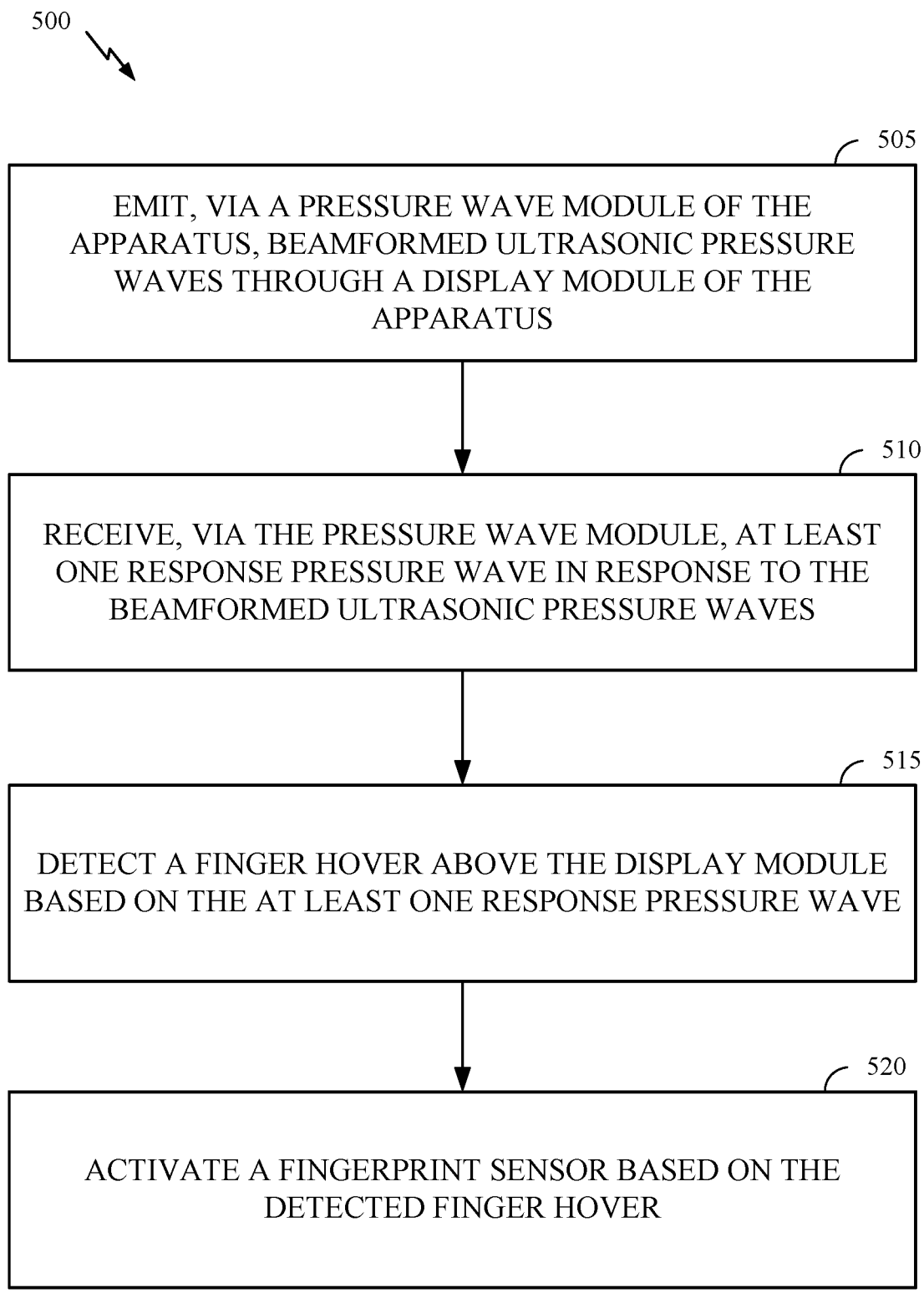
FIG. 5 is a flow diagram illustrating example operations for activating the fingerprint sensor of the electronic device based on beamformed pressure waves, in accordance with certain aspects of the present disclosure.

FIG. 5 is a flow diagram illustrating example operations 500 for activating the fingerprint sensor of the electronic device based on beamformed pressure waves, in accordance with certain aspects presented herein. According to aspects, operations 200 may be performed, for example, by one or more processors, such as the controller module 106 and/or processor 904.

Operations 500 begin at block 505 with emitting, via a pressure wave module of the apparatus, beamformed ultrasonic pressure waves through a display module of the apparatus.

At block 510, the one or more processors receive, via the pressure wave module, at least one response pressure wave in response to the beamformed ultrasonic pressure waves.

At block 515, the one or more processors detect a finger hover above the display module based on the at least one response pressure wave.

At block 520, the one or more processors activates a fingerprint sensor based on the detected finger hover.

As noted, in some cases, detecting a finger hover may be based on beamforming pressure waves emitted by the fingerprint sensor 104. For example, FIG. 6 illustrates detecting the finger hover based on beamformed pressure waves, in accordance with certain aspects of the present disclosure.

Figure 6:
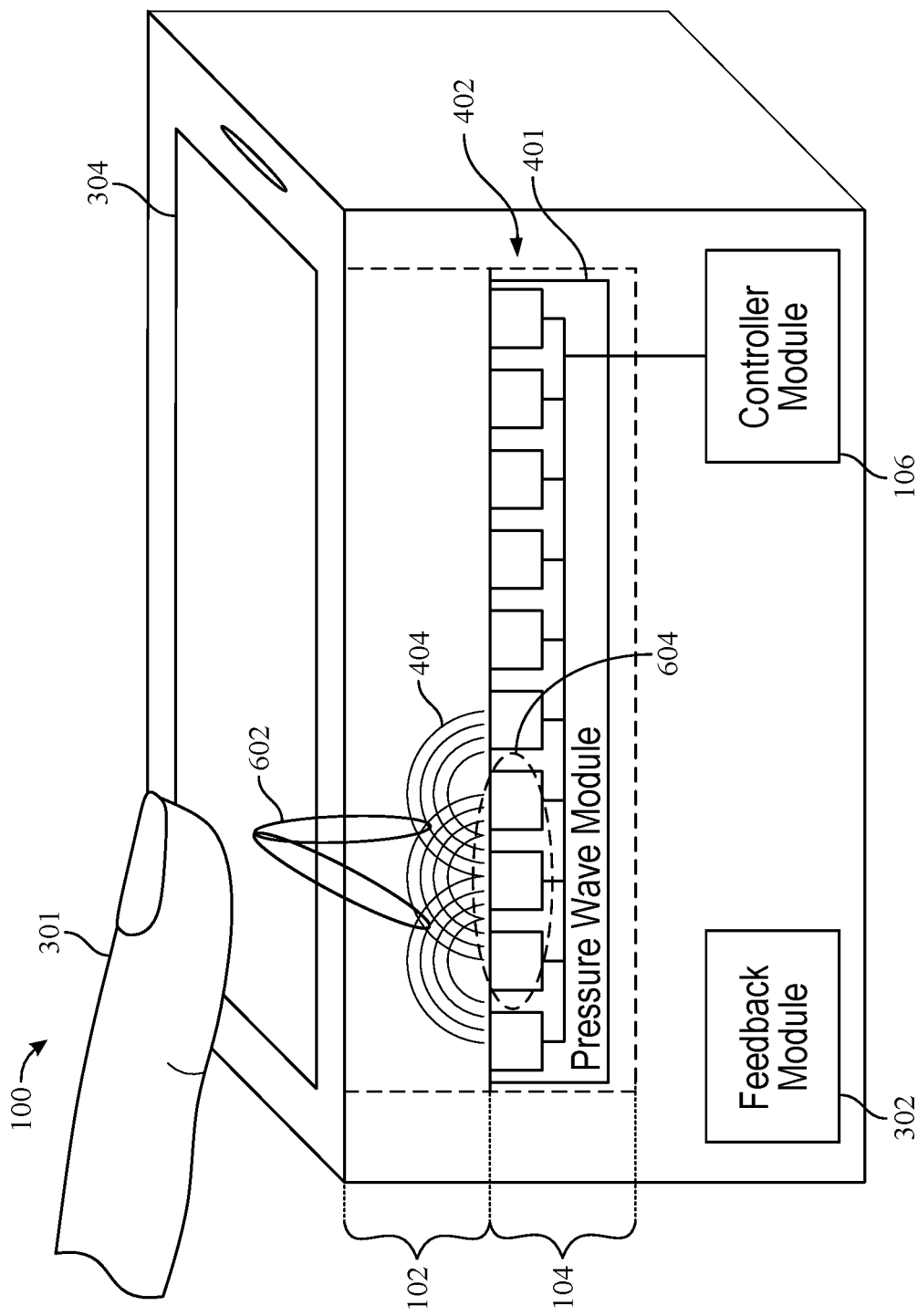
FIG. 6 illustrates detecting the finger hover based on beamformed pressure waves, in accordance with certain aspects of the present disclosure.

As illustrated in FIG. 6, the pressure wave module 401 in the fingerprint sensor 104 may include a plurality of transducers 402 configured to emit pressure waves 404. In some cases, the pressure waves 404 may be emitted in a megahertz (e.g., ultrasound) range. According to aspects, the controller module 106 may be configured to control different sets of transducers of the plurality of transducers 402 to selectively emit the pressure waves 404, generating a beamformed pressure wave 602. For example, as illustrated, the control module 106 may be configured to control transducers 604 of the pressure wave module 401 to emit pressure waves 404. The controller module 106 may control the transducers 604 to emit the pressure waves 404 such that the pressure waves constructively and destructively interfere with each other to form the beamformed pressure wave 602.

In some cases, controller module 106 may control the formation of the beamformed pressure wave 602 by controlling the time the pressure waves 404 are emitted from each of the transducers 604. The controller module 106 may then steer the beamformed pressure wave 602 through different portions of the display module 102 by selectively controlling different sets of the transducers 402. Additionally, in some cases, the controller module 106 may change a direction or a focal depth of the beamformed pressure wave 602 by operating only a subset of the transducers 402 in the fingerprint sensor 104 or operating the one or more the transducers 402 according to a time delay pattern.

Accordingly, focusing the pressure waves 404 in such a manner increases a transmit power associated with the beamformed pressure wave 602. Increasing the transmission power associated with the pressure waves 404 (e.g., via the beamformed pressure wave 602) may result in a greater receive power of response waves reflected by the finger and allows the finger hover 201 to be detected at greater distances (e.g., several millimeters above the display module 102) as compared to using a planar ultrasonic wave whose transmit power is spread across a plane.

Accordingly, as noted, the controller module 106 may selectively control the transducers 402 of the pressure wave module 401 to steer the beamformed pressure wave 602 through different portions of the display module 102.

In some cases, the pressure wave module may receive at least one response pressure wave (e.g., a reflected pressure wave) in response to the beamformed ultrasonic pressure waves. Based on the at least one response pressure wave, a finger hover 201 above the display module 102 may be detected.

For example, one or more pressure waves may be reflected off of the finger and received at the pressure wave module. Based on the one or more reflected response pressure waves, the finger hover may be detected.

In response to detecting the finger hover, the fingerprint sensor may be activated. In some cases, detecting the finger may be based on a certain receive signal strength of the reflected response pressure waves. For example, in some cases, the pressure wave module 401 receive a plurality of reflected response pressure waves in response to the beamformed pressure wave 602. According to aspects, if the plurality of reflected response pressure waves received by the pressure wave module 401 have a signal strength above a certain threshold, the fingerprint sensor 104 may detect the finger hover 301.

As noted above, certain aspects of the present disclosure explain that the fingerprint sensor may itself detect the finger hover. In such cases, activating the fingerprint sensor may include transitioning the fingerprint sensor from a power saving mode that uses a minimal amount of power and processing capability for beamforming a pressure wave to more-advanced processing mode that allows the fingerprint sensor to detect fingerprints on the finger. In other cases, when the finger hover is detected using a different type of sensor (e.g., an inductance-based sensor, a capacitance-based sensor, an optical-based sensor, etc.) the fingerprint sensor may be powered off or remain in a lower power mode. Upon detection of the finger hover by the different type of sensor, the fingerprint sensor may be transitioned to the more-advanced processing mode that allows the fingerprint sensor to detect fingerprints on the finger.

In certain cases, beamforming of ultrasonic pressure waves through the display module 102 may be improved by using different design constraints for the display module 102 and fingerprint sensor 104. For example, as noted above, the display module 102 may comprise a first plurality of layers and the pressure wave module 401 of the fingerprint sensor 104 may comprise a second plurality of layers.

Figure 7A:
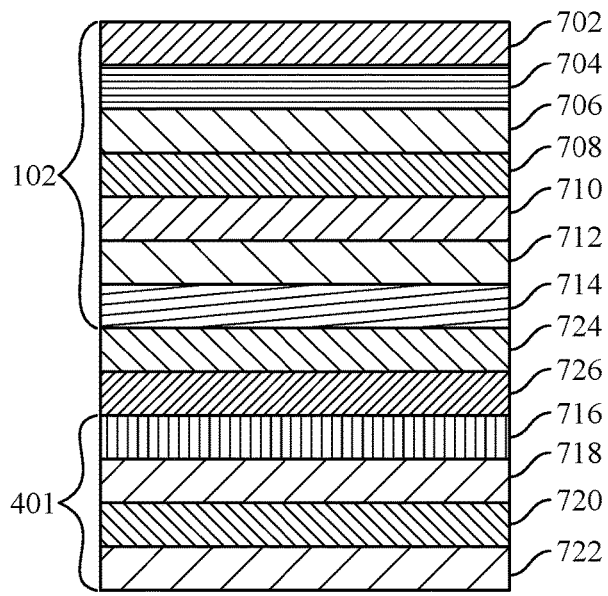
FIGS. 7A-7C illustrate the different layers of a display module and pressure wave module, in accordance with certain aspects of the present disclosure.

In some cases, as illustrated in FIG. 7A, the first plurality of layers of the display module 102 may comprise, for example, a cover glass layer 702, a first optical clear adhesive (OCA) layer 704 disposed below the cover glass layer 702, a polarizer layer 706 disposed below the first OCA layer 704, a back plate pressure sensitive adhesive (BPSA) layer 708 disposed below the polarizer layer 706, a touch sensor layer 710 disposed below the BPSA layer 708, a second OCA layer 712 disposed below the touch sensor layer 710, and a display panel 714 disposed below the second OCA layer 712.

According to aspects, the second plurality of layers of the pressure wave module 401 may include, for example, a thin film transistor (TFT) glass layer 716, a copolymer layer 718, a conductive layer 720, and a dielectric protection layer 722. According to aspects, the copolymer layer 718 may include a plurality of elements each configured to generate ultrasonic pressure waves (e.g., 404), such as the transducers 402. Further, in some cases, the TFT glass layer 716 may comprise circuitry configured to collectively control (e.g., via the controller module 106) the plurality of elements (e.g., transducers 402) in the copolymer layer 718 to generate an ultrasonic pressure wave beam (e.g., 602) using the ultrasonic pressure waves and steer the ultrasonic pressure wave beam through the display module 102. Additionally, in some cases, the dielectric protection layer (e.g., a die attached film layer) may be configured to prevent corrosion associated with the pressure wave module 401.

Further, in some cases, a size of each of the elements in the plurality of elements and a spacing between the elements in the plurality of elements may depend, at least in part, on a focal depth and a signal strength of the ultrasonic pressure wave beam (e.g., 602) required to detect a finger hover over the display module at a predefined distance. For example, in some cases, it may be desired to detect a finger hover five millimeters above the display module with a receive signal strength of X dB. In this case, a size of each of the elements (e.g., transducers 402) and a spacing between each of the elements may be set such that the finger hover may be detected at least 5 millimeters above the display module and with a receive signal strength of at least X db.

In some cases, an order of the second plurality of layers in the pressure wave module 401 may depend on an acoustic resonance value associated with the display module 102. For example, in some cases, the ordering of the second plurality of layers may be determined such that an acoustic resonance value of the ordered second plurality of layers closely matches the acoustic resonance value of the first plurality of layers. According to aspects, matching the acoustic resonance values of the second plurality of layers with the first plurality of layers may allow ultrasonic pressure waves to more-easily pass through the display module 102 without much attenuation at an interface between the display module 102 and the pressure wave module 103.

Figure 7B:
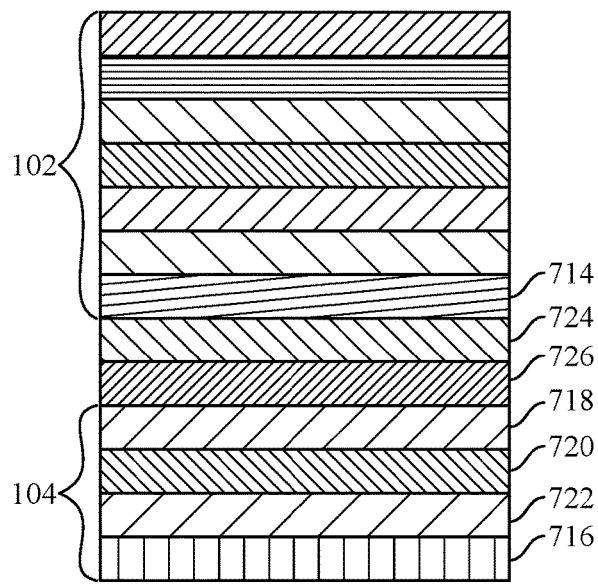
Figure 7C:
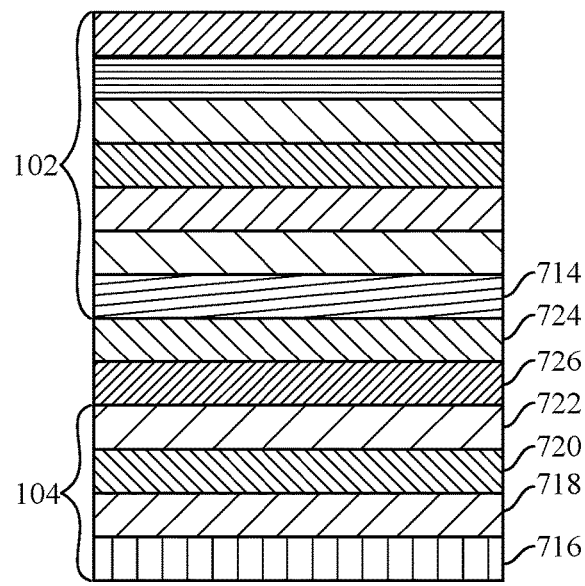

FIGS. 7A-7C illustrate different orderings for the pressure wave module 401, in accordance with certain aspects presented herein. For example, as illustrated in FIG. 7A, the ordering of the pressure wave module 401 may comprise the TFT glass layer 716 being disposed below a bottom layer of the first plurality of layers of the display module 102 (e.g., such as the display panel 714), the copolymer layer 718 being disposed below the TFT glass layer 716, the conductive layer 720 being disposed below the copolymer layer 718, and the dielectric protection layer 722 being disposed below the conductive layer 720.

As illustrated in FIG. 7B, the ordering of the pressure wave module 401 may comprise the copolymer layer 718 being disposed below a bottom layer of the first plurality of layers of the display module (e.g., the display panel 714), the conductive layer 720 being disposed below the copolymer layer 718, the dielectric protection layer 722 being disposed below the conductive layer 720, and the TFT glass layer 716 being disposed below the dielectric protection layer 722.

As illustrated in FIG. 7C, the ordering of the pressure wave module 401 may comprise the dielectric protection layer 722 being disposed below a bottom layer of the first plurality of layers of the display module (e.g., the display panel 714), the conductive layer 720 being disposed below the dielectric protection layer 722, the copolymer layer 718 being disposed below the conductive layer 720, and the TFT glass layer 716 being disposed below the copolymer layer 718.

According to aspects, the pressure wave module 401 may be configured to generate ultrasonic pressure waves at a frequency. Further, the pressure wave module 401 may be coupled with the display module 102 by an adhesive layer 724. In some cases, a thickness of the adhesive layer 724 may be configured to be one of a half-wavelength or one quarter-wavelength of the frequency at which the pressure wave module 401 is configured to generate and emit the ultrasonic pressure waves. Such thickness may help match the acoustic resonance values of the pressure wave module 401 and display module 102, allowing for a stronger output signal. For example, the adhesive layer 724 may be considered a matching layer that matches the acoustic impedances between two neighboring layers. Depending on the acoustic impedances of the neighboring layers, the thickness of the adhesive layer 724 can be either a half wavelength or a quarter wavelength. For example, in some cases, when each neighboring layer has a larger impedance as compared to the adhesive layer 724, the thickness of the adhesive layer 724 may be a half wavelength, whereas if one neighboring layer has a larger acoustic impedance while the other neighboring layer has a smaller acoustic impedance, the thickness of the adhesive layer 724 may be a quarter wavelength.

Additionally, in some cases, a spacer layer 726 may be disposed between the display module 102 and the pressure wave module 401 and, In some cases, the spacer layer 726 may be composed of a plastic material, such as polyethylene terephthalate, and may help mitigate effects caused to a response signal associated with spatial resolution (e.g., line-pairs per millimeter (LPMM)) received by the pressure wave module 401. In other words, the spacer layer 726 may affect a spatial resolution associated with a response signal received by the pressure wave module 401. In some cases, the spacer layer 726 may be disposed between the display module 102 and the adhesive layer 724. In other cases, for example as illustrated in FIGS. 7A-7C, the spacer layer 726 may be disposed between the adhesive layer 724 and pressure wave module 401.

According to aspects, in order to get the best output signal (e.g., beamformed pressure wave 502), the second plurality of layers of the pressure wave module 401 may be optimized, taking into account the resonance of the pressure wave module 401 itself. For example, the resonance of the pressure wave module 401 may be determined by the thickness of each individual layer of the second plurality of layers. Accordingly, to obtain the best output signal, the effective thickness of the pressure wave module 401 may be configured to be an odd multiple of a quarter of a wavelength associated with the ultrasonic pressure waves, wherein the wavelength of the ultrasonic pressure waves is based on a speed of sound in each of the second plurality of layers and the frequency of the ultrasonic pressure waves.

Figure 8:
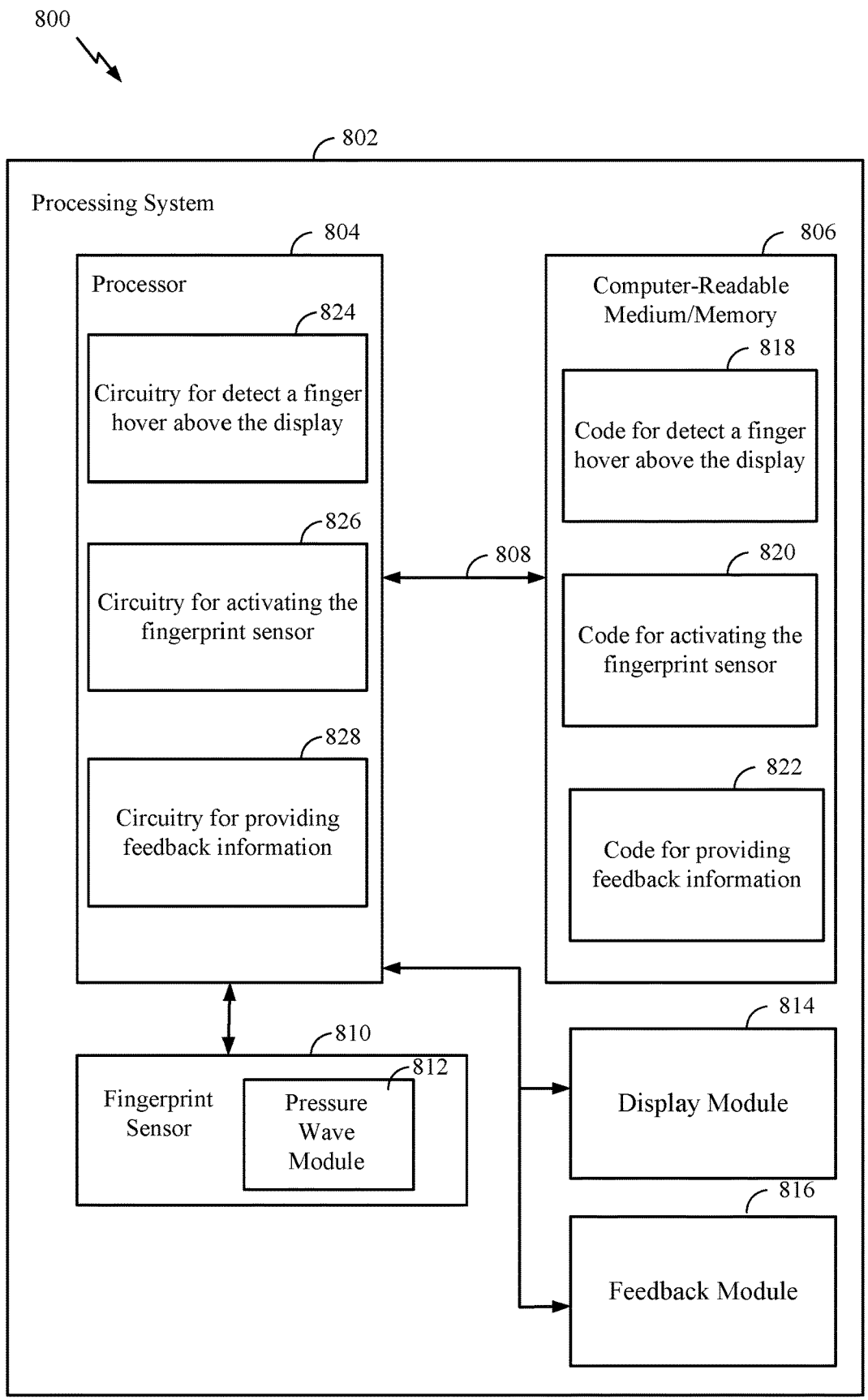
FIG. 8 illustrates an electronic device that may include various components configured to perform operations for the techniques disclosed herein in accordance with aspects of the present disclosure.

FIG. 8 illustrates an electronic device 800 that may include various components (e.g., corresponding to means-plus-function components) configured to perform operations for the techniques disclosed herein, such as the operations illustrated in, and described in relation to, FIGS. 2-4 and 6. In some cases, the electronic device 800 may comprise the electronic device 100 illustrated in FIGS. 1, 3, 4, and 6 The electronic device 800 includes a processing system 802 configured to perform processing functions for the electronic device 800. For example, in some cases, the processing system 802 may be configured to control a fingerprint sensor 810 to generate and emit, via a pressure wave module 812 in the fingerprint sensor 810, pressure waves through a display module 814 of the electronic device 800. In response to the emitted pressure waves, the processing system 802 may detect a finger hover above the display module 814 and provide feedback information via a feedback module 816.

The processing system 802 includes a processor 804 coupled to a computer-readable medium/memory 806 via a bus 808. In certain aspects, the computer-readable medium/memory 806 is configured to store instructions (e.g., computer-executable code) that when executed by the processor 804, cause the processor 804 to perform the operations illustrated in FIG. 2, or other operations for performing the various techniques discussed herein for activating the fingerprint sensor 810 of the electronic device 800. In certain aspects, computer-readable medium/memory 806 stores code 818 for detecting a finger hover above the display module 814; code 820 for activating the fingerprint sensor 810 based, at least in part, on the detected finger hover; and code 822 for providing, in response to detecting the finger hover, feedback information via the feedback module 816 to assist in scanning the finger using the fingerprint sensor 810.

In certain aspects, the processor 804 includes circuitry configured to implement the code stored in the computer-readable medium/memory 806. For example, the processor 804 includes circuitry 824 for detecting a finger hover above the display module 814; circuitry 826 for activating the fingerprint sensor 810 based, at least in part, on the detected finger hover; and circuitry 828 for providing, in response to detecting the finger hover, feedback information via the feedback module 816 to assist in scanning the finger using the fingerprint sensor 810.

Figure 9:
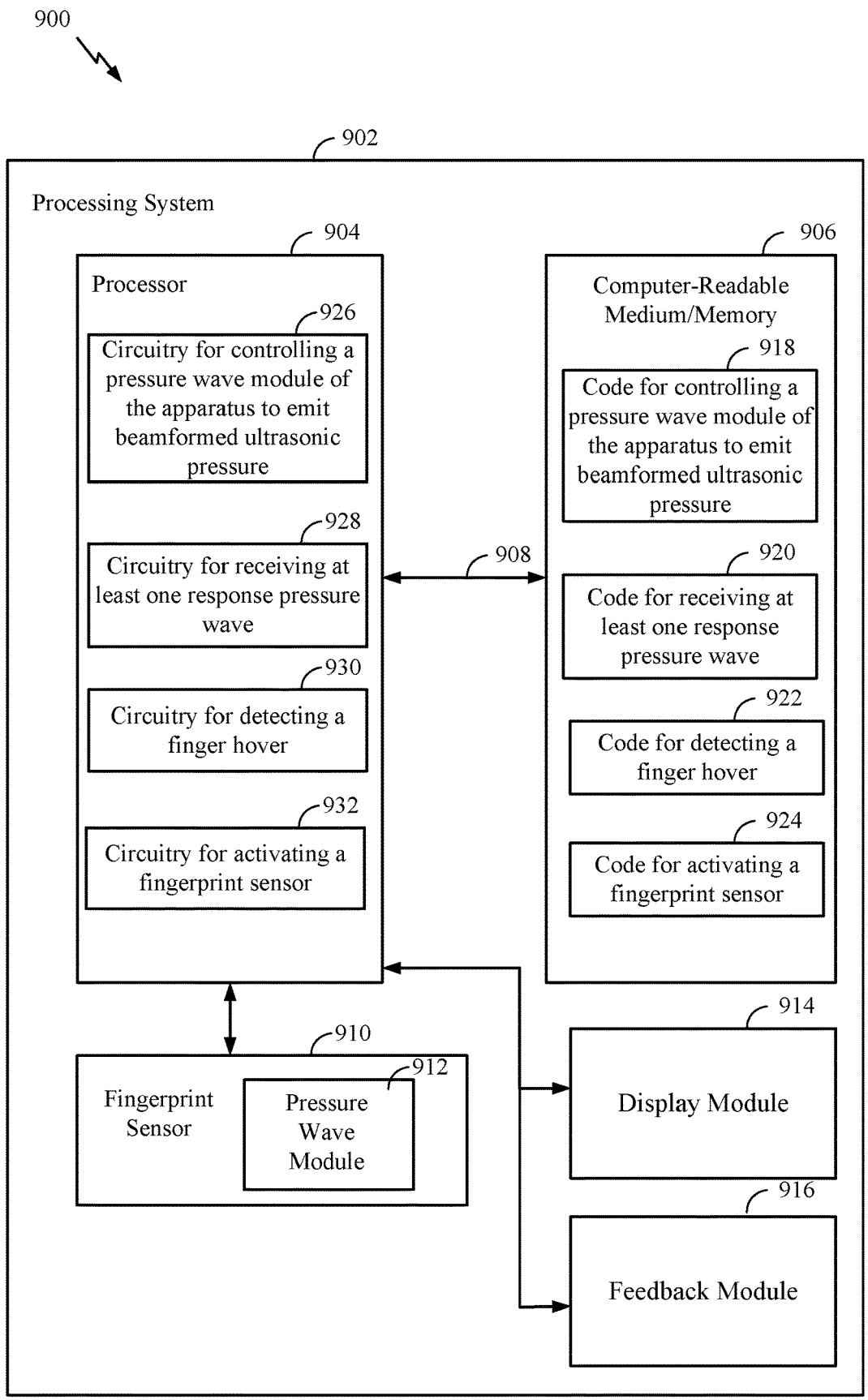
FIG. 9 illustrates an electronic device that may include various components configured to perform operations for the techniques disclosed herein in accordance with aspects of the present disclosure.

FIG. 9 illustrates an electronic device 900 that may include various components (e.g., corresponding to means-plus-function components) configured to perform operations for the techniques disclosed herein, such as the operations illustrated in, and described in relation to, FIGS. 5 and 6. In some cases, the electronic device 900 may comprise the electronic device 100 illustrated in FIG. 6 The electronic device 900 includes a processing system 902 configured to perform processing functions for the electronic device 900. For example, in some cases, the processing system 902 may be configured to control a fingerprint sensor 910 to generate and emit, via a pressure wave module 912 in the fingerprint sensor 910, beamformed ultrasonic pressure waves through a display module 914 of the electronic device 900. In response to the emitted beamformed ultrasonic pressure waves, the pressure wave module 912 may receive at least one response pressure wave. Accordingly, based on the at least one response pressure wave, the processing system 902 may detect a finger hover above the display module 914.

The processing system 902 includes a processor 904 coupled to a computer-readable medium/memory 906 via a bus 908. In certain aspects, the computer-readable medium/memory 906 is configured to store instructions (e.g., computer-executable code) that when executed by the processor 904, cause the processor 904 to perform the operations illustrated in FIG. 5, or other operations for performing the various techniques discussed herein for activating the fingerprint sensor 910 of the electronic device 900 based on beamformed pressure waves. In certain aspects, computer-readable medium/memory 906 stores code 918 for emitting, via the pressure wave module 912 of, beamformed ultrasonic pressure waves through the display module 914; code 920 for receiving, via the pressure wave module 912, at least one response pressure wave in response to the beamformed ultrasonic pressure waves; code 922 for detecting a finger hover above the display module 914 based on the at least one response pressure wave; and code 924 for activating the fingerprint sensor 910 based on the detected finger hover.

In certain aspects, the processor 904 includes circuitry configured to implement the code stored in the computer-readable medium/memory 906. For example, the processor 904 includes circuitry 926 for emitting, via the pressure wave module 912 of, beamformed ultrasonic pressure waves through the display module 914; circuitry 928 for receiving, via the pressure wave module 912, at least one response pressure wave in response to the beamformed ultrasonic pressure waves; circuitry 930 for detecting a finger hover above the display module 914 based on the at least one response pressure wave; and circuitry 932 for activating the fingerprint sensor 910 based on the detected finger hover.

Additional Considerations

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of a PHY layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 2 and FIG. 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for activating a fingerprint sensor of an apparatus, the method comprising:
    detecting a finger hover above a display module of the apparatus, wherein detecting the finger hover comprises:
        emitting beamformed ultrasonic pressure waves in a megahertz range from the fingerprint sensor through different portions of the display module of the apparatus; and
        detecting the finger hover above at least one portion of the different portions of the display module based on the beamformed ultrasonic pressure waves;
    activating the fingerprint sensor based, at least in part, on the detected finger hover; and
    providing, in response to detecting the finger hover, feedback information to assist in scanning the finger using the fingerprint sensor.

2. The method of claim 1, wherein the fingerprint sensor comprises an ultrasonic fingerprint sensor configured for sensing fingerprints based on ultrasonic pressure waves.

3. The method of claim 1, wherein detecting the finger hover is based on at least one of: an inductance-based sensor, a capacitance-based sensor, an optical-based sensor, or an ultrasonic-based sensor.

4. The method of claim 1, wherein beamforming ultrasonic pressure waves from the fingerprint sensor comprises changing a direction or a focal depth of the beamformed ultrasonic pressure waves by operating only a subset of one or more elements in the fingerprint sensor or operating the one or more elements according to a time delay pattern.

5. The method of claim 1, wherein activating the fingerprint sensor comprises activating only a portion of a larger area of the fingerprint sensor.

6. The method of claim 5, wherein the portion of the larger area of the portion is a variable portion.

7. The method of claim 6, wherein the variable portion corresponds to an area of the fingerprint sensor underneath the finger hover.

8. The method of claim 6, further comprising determining the variable portion based, at least in part, on a pattern of usage of the apparatus and a finger touch area range associated with the finger.

9. The method of claim 6, wherein the variable portion is adjustable based on a size of the finger.

10. The method of claim 5, wherein the portion of the larger area of the portion comprises a fixed portion.

11. The method of claim 10, wherein the fixed portion corresponds to a bottom portion of the display module.

12. The method of claim 1, further comprising activating the display module in response to detecting the finger hover.

13. The method of claim 1, wherein the feedback information comprises at least one of visual feedback displayed on the display module, haptic feedback, or auditory feedback.

14. The method of claim 13, wherein the haptic feedback is provided by a force sensor or a tactile sensor.

15. An apparatus for activating a fingerprint sensor, the apparatus comprising:
at least one processor configured to:
detect a finger hover above a display module of the apparatus, wherein, in order to detect the finger hover, the at least one processor is further configured to:
emit beamformed ultrasonic pressure waves in a megahertz range from the fingerprint sensor through different portions of the display module of the apparatus; and
detect the finger hover above at least one portion of the different portions of the display module based on the beamformed ultrasonic pressure waves;
activate the fingerprint sensor based, at least in part, on the detected finger hover;
provide, in response to detecting the finger hover, feedback information to assist in scanning the finger using the fingerprint sensor; and
a memory coupled with the at least one processor.

16. The apparatus of claim 15, wherein the fingerprint sensor comprises an ultrasonic fingerprint sensor configured for sensing fingerprints based on ultrasonic pressure waves.

17. The apparatus of claim 15, wherein detecting the finger hover is based on at least one of: an inductance-based sensor, a capacitance-based sensor, an optical-based sensor, or an ultrasonic-based sensor.

18. The apparatus of claim 15, wherein the at least one processor is further configured to change a direction or a focal depth of the beamformed ultrasonic pressure waves by operating only a subset of one or more elements in the fingerprint sensor or operating the one or more elements according to a time delay pattern.

19. The apparatus of claim 15, wherein the at least one processor is further configured to activate only a portion of a larger area of the fingerprint sensor.

20. The apparatus of claim 19, wherein the portion of the larger area of the portion is a variable portion.

21. The apparatus of claim 20, wherein the variable portion corresponds to an area of the fingerprint sensor underneath the finger hover.

22. The apparatus of claim 20, wherein the at least one processor is further configured to determine the variable portion based, at least in part, on a pattern of usage of the apparatus and a finger touch area range associated with the finger.

23. The apparatus of claim 20, wherein the variable portion is adjustable based on a size of the finger.

24. The apparatus of claim 19, wherein the portion of the larger area of the portion comprises a fixed portion.

25. The apparatus of claim 24, wherein the fixed portion corresponds to a bottom portion of the display module.

26. The apparatus of claim 15, further comprising activating the display module in response to detecting the finger hover.

27. The apparatus of claim 15, wherein the feedback information comprises at least one of visual feedback displayed on the display module, haptic feedback, or auditory feedback.

28. The apparatus of claim 27, wherein the haptic feedback is provided by a force sensor or a tactile sensor.

29. An apparatus for activating a fingerprint sensor, the apparatus comprising:
means for detecting a finger hover above a display module of the apparatus, wherein the means for detecting the finger hover comprise:
means for emitting ultrasonic beamformed pressure waves in a megahertz range from the fingerprint sensor through different portions of the display module of the apparatus; and
means for detecting the finger hover above at least one portion of the different portions of the display module based on the ultrasonic beamformed pressure waves;
means for activating the fingerprint sensor based, at least in part, on the detected finger hover; and
means for providing, in response to detecting the finger hover, feedback information to assist in scanning the finger using the fingerprint sensor.

30. A non-transitory computer-readable medium for activating a fingerprint sensor of an apparatus, the non-transitory computer-readable medium comprising:
instructions that, when executed by at least one processor, cause the at least one processor to:
detect a finger hover above a display module of the apparatus, wherein the instructions that cause the at least one processor to detect the finger hover comprise instructions that cause the at least one processor to:
emit beamformed ultrasonic pressure waves in a megahertz range from the fingerprint sensor through different portions of the display module of the apparatus; and
detect the finger hover above at least one portion of the different portions of the display module based on the beamformed ultrasonic pressure waves;
activate the fingerprint sensor based, at least in part, on the detected finger hover; and
provide, in response to detecting the finger hover, feedback information to assist in scanning the finger using the fingerprint sensor.

* * * * *